US008982123B2

(12) United States Patent
Morgana

(10) Patent No.: US 8,982,123 B2
(45) Date of Patent: Mar. 17, 2015

(54) REDUCING THE NUMBER OF VERTICES IN A CLUSTERED DELAUNAY MESH

(75) Inventor: Stephen C. Morgana, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1981 days.

(21) Appl. No.: 12/142,174

(22) Filed: Jun. 19, 2008

(65) Prior Publication Data

US 2009/0315882 A1  Dec. 24, 2009

(51) Int. Cl.
 *G06T 17/00* (2006.01)
 *H04N 1/60* (2006.01)

(52) U.S. Cl.
 CPC .................................. *H04N 1/6058* (2013.01)
 USPC ........................................................ 345/424

(58) Field of Classification Search
 USPC .................................................. 345/424, 419
 See application file for complete search history.

(56) References Cited

U.S. PATENT DOCUMENTS 6,480,301 B1 * 11/2002 Cholewo .................... 358/1.9
6,611,267 B2 * 8/2003 Migdal et al. ................ 345/428

OTHER PUBLICATIONS

Zhou, Hong et al., Energy-Based Hierarchical Edge Clustering of Graphs, Mar. 7, 2008, IEEE Pacific Visualisation Symposium 2008, Pa.*

Siddiqui, Rizwan A et al., Hierarchical Compression of Tetrahedral Meshes Through Clustering and Vector Quantization, Jun. 13, 2007, Signal Processing and Communications Applications, 2007. SIU 2007. IEEE 15th, pp. 1-4.*
G. Leach, "Improving Worst-Case Optimal Delaunay Triangulation Algorithms," Department of Computer Science, Royal melbourne Institute of Technology, Melbourne, Australia, Jun. 15, 1992, pp. 1-7.
Cignoni, et al., "DeWall: A Fast Divide & Conquer Delaunay Triangulation Algorithm in $E^d$," Oct. 1, 1997, pp. 1-21.
Virrankoski, et al., "TASC: Topology Adaptive Spatial Clustering for Sensor Networks," Embedded Networks and Applications Lab (ENLAB), Yale University, New Haven, CT 06520, pp. 1-10.

(Continued)

*Primary Examiner* — Xiao M. Wu
*Assistant Examiner* — Matthew D Salvucci
(74) *Attorney, Agent, or Firm* — Philip E. Blair; Fleit Gibbons Gutman Bongini & Bianco P.L.

(57) ABSTRACT

What is disclosed is a system and method for reducing the number of vertices obtained when building an image gamut from a large number of image pixels. In one embodiment, a color image comprising a plurality of image pixels is received and the color data points measured. An n-dimensional Delaunay triangulation is defined wherein vertices of the triangulation comprise clusters of the measured data points. Cluster analysis is performed on the color data points to determine which existing cluster will receive a new point or if a new cluster should be created. The point clusters are added to the triangulation. For point clusters within the triangulation, a representative point is defined which serves as a normal vertex for the point cluster. The vertex is then added into the triangulation and a gamut generated. The gamut can be used to model a gamut of the color image or a color device.

15 Claims, 5 Drawing Sheets

(56) References Cited

OTHER PUBLICATIONS

Ito, et al., "A Solution-Based Adaptive Redistribution method for Unstructured Meshes," Department of Mechanical Engineering, University of Alabama at Birmingham, Birmingham, AL., pp. 147-161.

Shewchuk, J., "Delaunay Refinement Algorithms for Triangular Mesh Generation," Department of Electrical Engineering and Computer Science, University of California at Berkeley, Berkeley, CA., May 21, 2001, pp. 1-58.

* cited by examiner

REDUCING THE NUMBER OF VERTICES IN A CLUSTERED DELAUNAY MESH

TECHNICAL FIELD

The present invention is directed to methods for reducing the number of vertices in a Delaunay mesh when a large number of image pixel data points are used to generate a gamut map to model the color gamut of a color image or device.

BACKGROUND

In digital imaging systems, color management systems can be used to control conversion between the color representations of various devices, such as scanners, cameras, monitors, TV screens, printers, offset presses, corresponding media, and the like. One primary goal of such a color management system is to obtain a good match across color devices to ensure image reproduction quality. For example, a reproduced color image should appear in substantially the same colors when displayed on a LCD monitor, plasma TV screen, or on a printed frame of video, as in the original. Color management systems utilize color matching techniques to match the same appearance on an output device in the needed color intensities to accurately reproduce the original image.

Various color matching techniques can be used to adjust the numerical values sent to, or received from, differing devices such that the perceived colors reproduced on a color output device remain substantially consistent. One problem is how to deal with a color that cannot be reproduced on a particular output device when the reproducible color ranges between colors are different. There is no common method for this process. Performance often depends on the capability of each color matching method.

In order to describe the behavior of the various output devices, they must be compared (calibrated) in relation to a standard color space. Often a step called linearization is performed in order to get the most out of limited 8-bit color paths. As an intermediate result, the device gamut is described in the form of measurements which are often not immediately usable. The transformation of the measured data into a more regular form, usable by the color reproduction software/hardware application, is called profiling. After profiling, an idealized color description of the device is created. This description is called a color profile or device profile. See: "*The GATF Practical Guide to Color Management*", by: Adams & Weisberg, GATF Press (2000) ISBN 0883622483.

In color reproduction, gamuts are commonly represented as areas with a curved edge representing the monochromatic colors. Gamut areas typically have triangular shapes (or tetrahedrons) because color reproduction is often done with three primary colors. One common usage refers to the subset of colors which can be accurately represented in a given circumstance, such as within a given color space or by a certain output device. Another usage refers to the complete set of colors found within an image at a given time. In this context, converting a digitized image to a different color space, or outputting it to a given medium using a certain output device, generally alters the gamut because some of the original colors are lost in the process. See: "*Introduction to Color Imaging Science*", by Hsien-Che Lee, Cambridge University Press (2005) ISBN 052184388X. Since different devices often don't have the same gamut, they need some rearrangement near the borders of the color gamut. For instance, some colors may need to be shifted to an inside portion of the gamut as they otherwise cannot be represented on the output device and may end up simply being clipped. When certain colors cannot be displayed within a particular color model, those colors are said to be out of gamut.

Color management systems can utilize various methods to achieve desired color reproduction results by giving a user more control of the color gamut mapping process. For example, pure red which is contained in the RGB color model gamut is out of gamut in the CMYK model. While modern techniques allow increasingly good color approximations, the complexity of these systems often makes accurate color reproduction computationally impractical. What is therefore acceptable in terms of the accuracy of color reproduction is often a trade-off between computational complexity and the limits of human visual perception.

A technique referred to as Delaunay triangulation can be used to model points in color space in applications involving color processing. The color data points are typically three dimensional. However when it is desirable to model the gamut of a color image, the Delaunay triangulation may end up containing millions of points resulting in a large number of generated triangles or tetrahedrons within the mesh. This causes the generated color model to contain a large number of vertices. Managing such a large number of vertices in the Delaunay mesh is a problem in this art to which no adequate solutions have been presented.

Accordingly, what is needed in this art are increasingly sophisticated systems and methods for reducing the number of vertices in the Delaunay mesh generated when building a color gamut from a large number of measured image pixels.

BRIEF SUMMARY

What is disclosed is a novel system, method, and computer program product for reducing the number of vertices obtained when building an image gamut from a large number of image pixels. The present method constructs an n-dimensional Delaunay mesh represented by normal vertices (data points obtained from image measurement sensors). The normal vertices are redefined into point clusters to reduce the number of vertices and thus the total number of triangles or tetrahedrons existing in the mesh. By changing the clusterization factor, the number of vertices in the mesh is effectively controlled and thus the overall computational complexity reduced. Such a technique readily finds its intended uses in a wide variety of data processing applications involving a large number of individual data points, particularly in the color science arts.

In one example embodiment, a plurality of color data points of image pixels of a color image are received. A color scanning device known in the arts can be used to obtain the image pixel data points of a color image. Alternatively, the color data points are received from a memory or storage device, or from a network. An n-dimensional Delaunay mesh of individual point clusters is then defined. In 2-dimensions, the mesh is a triangulation. In 3-dimensions, the mesh is a tetrahedralization. A cluster analysis technique known in the arts is performed on the received color data points to determine which new point clusters need to be added to the mesh and which existing point cluster in the mesh is to receive a color data point. The Delaunay mesh of point clusters is then restructured. The restructuring involves, for each point cluster in the Delaunay mesh, at step 108A, determining a representative point to serve as a normal vertex for the cluster, and, at step 108B, adding the normal vertex to the Delaunay mesh. A color gamut can then be generated from the Delaunay mesh for the color image. A surface map of the color gamut can additionally be determined. The generated color gamut is used to model the gamut of a color device.

Advantageously, new point clusters can be added to the Delaunay mesh by determining a representative point to serve as a new normal vertex for the new point cluster and adding the new normal vertex to the mesh. Existing point clusters already in the mesh can be modified by first removing the existing vertex point for the cluster from the mesh and defining a new representative point for the existing cluster to serve as a new normal vertex and adding the new normal vertex to the mesh.

In areas within the mesh wherein more accuracy is desired, existing point clusters can be split. As provided herein, the splitting of existing point clusters is performed by removing the vertex associated with the existing point cluster from the mesh. Then, for each new point cluster to be added to the mesh, a representative point is determined which serves as a normal vertex for the new point cluster. The normal vertex is then added to the mesh. In areas within the mesh wherein less accuracy is desired, or wherein it is desirable to reduce further the complexity within a determined area in the mesh, existing clusters can be merged. As provided herein, the merging of existing clusters is preformed by removing the vertices of the existing clusters from the mesh. A representative point to serve as a normal vertex for the new point cluster is determined. The normal vertex is added to the mesh.

The foregoing and other features and advantages will be apparent from the following more particular description of the various embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
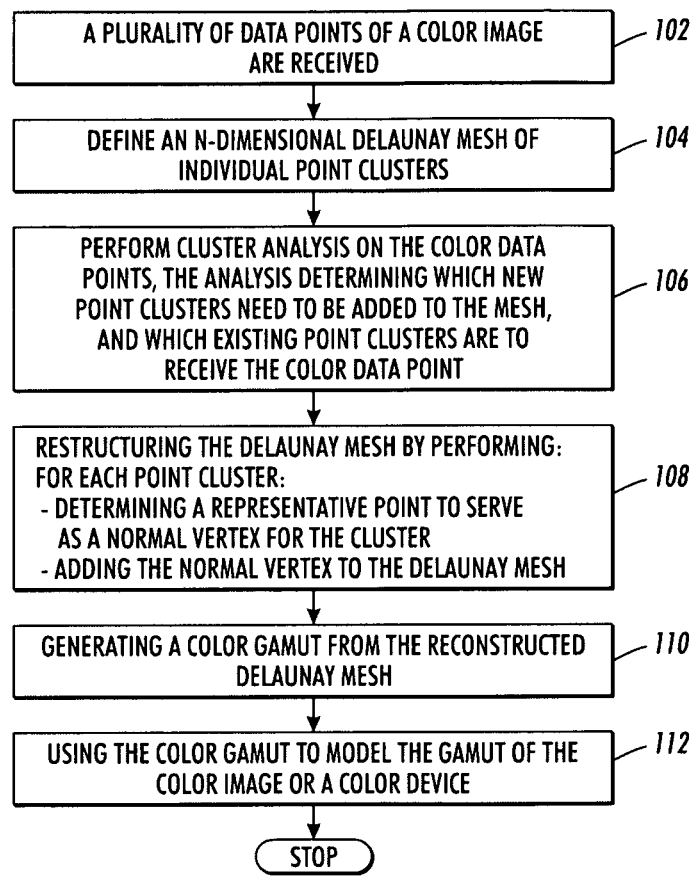
FIG. 1 is a flow diagram of one embodiment of the present method for reducing the number of vertices obtained when building an image gamut.

What is provided are a system and method for reducing the number of vertices obtained when building an image gamut from a large number of image pixels (data points) using a Delaunay mesh.

It should be understood that one of ordinary skill in this art would be readily familiar with many facets of color science such as, but not limited to, gamut mapping, and other techniques and algorithms common to the color science arts. Additionally, one of ordinary skill would be readily familiar with Delaunay meshes and other advanced mathematical techniques associated with triangulations as are familiar in this art. One of ordinary skill in this art would also be knowledgeable about computer science and software and programming systems and methods sufficient to implement the functionality and capabilities described in detail herein in their own hardware environments without undue experimentation.

As used herein, the term "color device" or "color output device" is any device capable of displaying a color image or outputting a color signal. Such devices include color printers, color copiers and other xerographic devices, photographic equipment and image reproduction equipment, displays and monitors, and the like. Any device wherein a color gamut can be used to model that device is intended to fall within the scope of this term.

The terms "Delaunay mesh", or more specifically, "Delaunay triangulation" and "Delaunay Tetrahedralization", as used herein, generically refers to a mesh of points satisfying existing Delaunay properties as they apply to n-dimensional points. The "triangulation" is defined for a mesh of 2-dimensional points. The "tetrahedralization" is defined for a mesh of 3-dimensional points. Other meshes for higher dimensions are defined as well.

The term "point clusters", as used in the field of cluster analysis, refers to collections of points related to each by a common trait such as proximity. The points in cluster analysis are also n-dimensional.

As discussed in the background section hereof, a technique referred to as Delaunay triangulation is used to construct an n-dimensional model of measured color data represented by points and maximize the minimum angle of all the angles of the triangles in the triangulation. However, when the colored data points (vertices) come from sensor measurements, there may be many additional data points that are almost the same. This causes the generated color model to contain a large number of vertices. As a result, a large number of small triangles or tetrahedrons are generated. Computationally managing such a large number of triangles or tetrahedrons in a color management system during a gamut mapping process is a problem in this art.

A Delaunay mesh (DT) is defined by a discrete set of points (P) in the plane such that no point is inside the circumcircle of any triangle in the mesh. The triangulation of the point set P corresponds to the dual graph of the Voronoi tessellation for P. For a set of points on the same line, there is no Delaunay triangulation because the triangulation is undefined for this case. For 4 points on the same circle (e.g., the vertices of a rectangle) the triangulation is not unique. Generalizations are possible to metrics other than Euclidean. However, in these cases, a Delaunay triangulation is not guaranteed to exist or be unique.

Based on the definition of the Delaunay triangulation, the circumcircle of a triangle formed by three points from the original point set is empty if it does not contain vertices other than the three that define it. Other points are permitted only on the very perimeter and not inside. The Delaunay condition for bi-dimensional spaces states that a triangle net is a Delaunay triangulation if all the circumcircles of all the triangles in the net are empty. It is possible to use it in tri-dimensional spaces by using a circumscribed sphere in place of the circumference.

Delaunay triangulations build meshes for the finite element method because of the angle guarantee and the fact that fast triangulation algorithms are known in this art. Finite element methods find approximate solutions of partial differential equations (PDE) as well as for integral equations. The solution approach is based either on eliminating the differential equation completely (steady state problems), or rendering the PDE into an equivalent ordinary differential equation, which is then solved using techniques such as finite differences, etc. Typically, the domain to be meshed is specified as a coarse simplicial complex. For the mesh to be numerically stable, it must be refined, for instance by using Ruppert's algorithm as described in "*Delaunay Refinement Algorithms for Triangular Mesh Generation*", by J. R. Shewchuk, Computational Geometry: Theory and Applications 22(1-3):21-74, May 2002, which is incorporated herein in its entirety by reference.

It is known that there exists a unique Delaunay triangulation for a set of points P, if P is a set of points in general position; i.e., no 3 points are on the same line and no 4 points are on the same circle, for a two dimensional set of points, or no n+1 points are on the same hyper plane and no n+2 points are on the same hyper sphere, for an n-dimensional set of points. The problem of finding the Delaunay triangulation of a set of points in n-dimensional Euclidean space can be converted to the problem of finding the convex hull of a set of points in (n+1)-dimensional space, by giving each point P an extra coordinate equal to $|P|^2$, taking the bottom side of the convex hull, and mapping back to n-dimensional space by deleting the last coordinate. As the convex hull is unique, so is the triangulation, assuming all facets of the convex hull are simplices. A facet not being a simplex implies that n+2 of the original points lay on the same d-hyper sphere, and the points were not in general position.

Let n be the number of points and d the number of dimensions. The union of all simplices in the triangulation is the convex hull of the points. The Delaunay triangulation contains at most $O(n^{d/2})$ simplices. In the plane (d=2), if there are b vertices on the convex hull, then any triangulation of the points has at most 2n−2−b triangles, plus one exterior face. The triangulation maximizes the minimum angle. Compared to any other triangulation of the points, the smallest angle in the Delaunay triangulation is at least as large as the smallest angle in any other. However, the Delaunay triangulation does not necessarily minimize the maximum angle. A circle circumscribing any Delaunay triangle does not contain any other input points in its interior. If a circle passing through two of the input points doesn't contain any other of them in its interior, then the segment connecting the two points is an edge of a Delaunay triangulation of the given points. The Delaunay triangulation of a set of points in d-dimensional spaces is the projection of the convex hull of the projections of the points onto a (d+1)-dimensional paraboloid. For a point P inside the convex hull of a Delaunay triangulation, the nearest vertex to P need not be one of the vertices of the triangle containing P.

The present method utilizes a Delaunay triangulation to construct an n-dimensional mesh of data represented by normal vertices (data points obtained from image measurement sensors). The normal vertices of the Delaunay mesh are redefined into point clusters when many points are closely related. This reduces the number of vertices and thus the total number of triangles or tetrahedrons existing in the mesh. Redefining the vertices of the mesh into clusters instead of measured vertices reduces the number of vertices and thus triangles (or tetrahedrons) to a smaller number. By changing the clusterization factor in accordance with the present method, the number of vertices in the mesh can be effectively controlled and thus the overall computational complexity effectively reduced in a color management system. This is achieved herein by having the Delaunay structure contain clusters instead of vertices.

Reference is now being made to the flow diagram of FIG. 1 which illustrates one embodiment of the present method. In one example embodiment, at step 102, a plurality of color data points of image pixels of a color image are received. A color scanning device known in the arts can be used to obtain the image pixel data points of a color image. Alternatively, the color data points are received from a memory or storage device, or from a network. At step 104, an n-dimensional Delaunay mesh of individual point clusters is then defined. In 2-dimensions, the mesh is a triangulation. In 3-dimensions, the mesh is a tetrahedralization. At step 106, a cluster analysis technique known in the arts is performed on the received color data points to determine which new point clusters need to be added to the mesh and which existing point cluster in the mesh is to receive a color data point. At step 108, the Delaunay mesh of point clusters is then restructured. The restructuring involves, for each point cluster in the Delaunay mesh, determining a representative point to serve as a normal vertex for the cluster, and adding the normal vertex to the Delaunay mesh. At step 110, a color gamut can then be generated from the Delaunay mesh for the color image. A surface map of the color gamut can additionally be determined. At step 112, the generated color gamut is used to model the gamut of a color image or color device.

Figure 2:
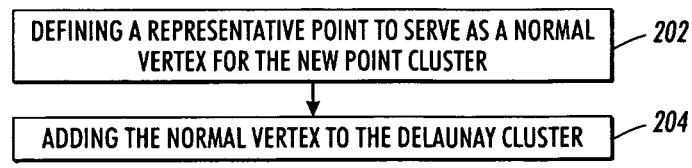
FIG. 2 illustrates a flow diagram of one embodiment of the method for adding a new point cluster to the Delaunay mesh structured in accordance with the flow diagram of FIG. 1.

Reference is now being made to FIG. 2 which illustrates a flow diagram of one embodiment of the method for adding a new point cluster to the Delaunay mesh structured in accordance with the flow diagram of FIG. 1. In one example embodiment, at step 202, a representative point is defined which serves as a normal vertex for the new point cluster. At step 204, the normal vertex is then added to the Delaunay mesh.

Figure 3:
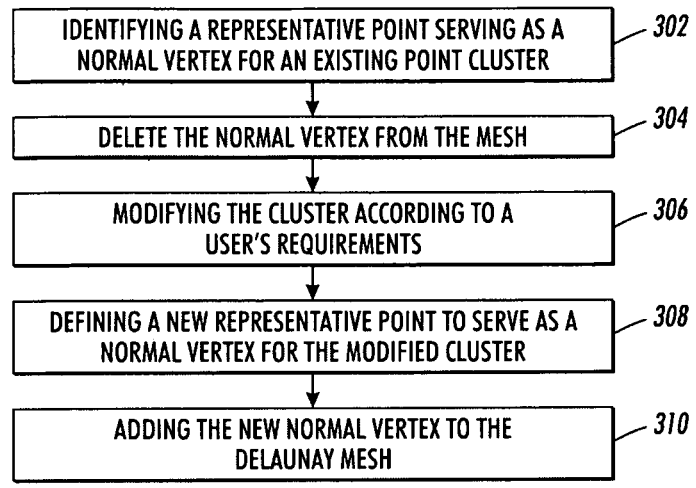
FIG. 3 illustrates a flow diagram of one embodiment of the method for modifying a point cluster already existing in the Delaunay mesh structured in accordance with the flow diagram of FIG. 1.

Reference is now being made to FIG. 3 which illustrates a flow diagram of one embodiment of the method for modifying a point cluster already existing in the Delaunay mesh structured in accordance with the flow diagram of FIG. 1. In one example embodiment, at step 302, a representative point which serves as a normal vertex for the existing point cluster in the mesh is identified. At step 304, the normal vertex is deleted from the mesh. At step 306, the cluster is modified according to a user's requirements. The modifying may include editing or replacing one or more values for the point cluster. At step 308, a representative point is defined which serves as a normal vertex for the modified cluster. At step 310, the normal vertex is then added to the Delaunay mesh.

Figure 4:
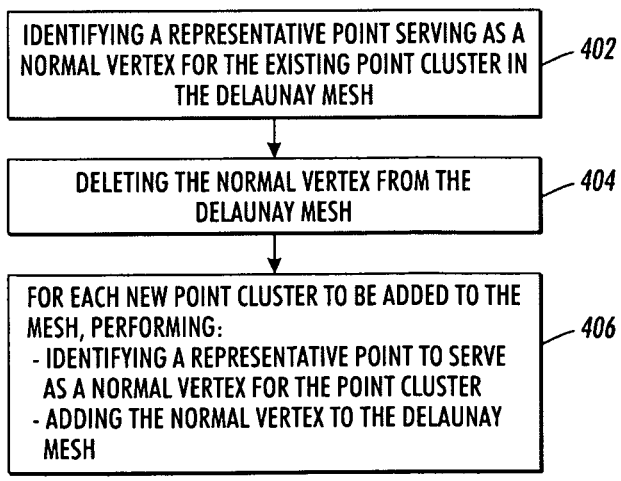
FIG. 4 illustrates a flow diagram of one embodiment of the method for splitting an existing point cluster into a plurality of new point clusters in the Delaunay mesh structured in accordance with the flow diagram of FIG. 1.

Reference is now being made to FIG. 4 which illustrates a flow diagram of one embodiment of the method for splitting an existing point cluster into a plurality of new point clusters in the Delaunay mesh structured in accordance with the flow diagram of FIG. 1. Clusters in the Delaunay mesh can be split into a plurality of clusters in determined areas within the mesh wherein, for example, increased accuracy is desired. In one example embodiment, at step 402, a representative point which serves as a normal vertex for the existing point cluster in the Delaunay mesh is identified. At step 404, the normal vertex is deleted from the Delaunay mesh. At step 406, for each new point cluster to be added to the mesh, a representative point is identified to serve as a normal vertex for the new point cluster, and the normal vertex is added to the Delaunay mesh.

Figure 5:
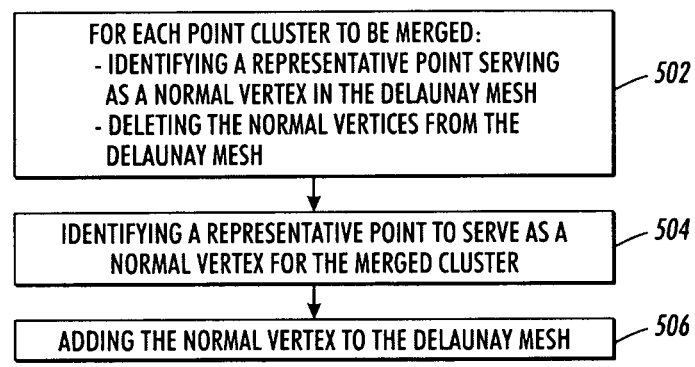
FIG. 5 illustrates a flow diagram of one embodiment of the method for merging existing point clusters into a new point cluster in the Delaunay mesh structured in accordance with the flow diagram of FIG. 1.

Reference is now being made to FIG. 5 which illustrates a flow diagram of one embodiment of the method for merging existing point clusters into a new point cluster in the Delaunay mesh structured in accordance with the flow diagram of FIG. 1. Clusters can be merged in determined areas within the Delaunay mesh wherein, for example, less accuracy or complexity is desired. In one example embodiment, at step 502, a representative point serving as a normal vertex for each point cluster to be merged is identified and the identified normal vertices are deleted from the Delaunay mesh. A new point cluster of the merged cluster is added to the Delaunay mesh by determining, at step 504, a representative point to serve as a normal vertex for the new merged point cluster. At step 506, the normal vertex is then added to the Delaunay mesh.

It should be appreciated that there are two primary approaches to computing the Delaunay triangulation. In the incremental approach, the Delaunay triangulation is computed to repeatedly add one vertex at a time. This re-triangulates affected portions of the mesh. When a vertex is added, a search is done for all triangles' circumcircles containing the vertex. Those triangles are removed and that part of the graph re-triangulated. This results in a running time of approximately $O(n^2)$. A common way to speed up this approach is "sweep line", which involves sorting the vertices by one coordinate and adding them in that order. Then, one only needs to keep track of circumcircles containing points of large enough first coordinate. The expected running time in two dimensions in this case is approximately $O(n^{3/2})$ although the worst case continues to be approximately $O(n^2)$. Its performance at low numbers of points is competitive but does not scale well above $10^4$ number of points. If one inserts the vertices in a random order, the expected running time is $O(n \log n)$. Another efficient $O(n \log n)$ incremental algorithm keeps the history of the triangulation in the form of a tree. The elements replacing a conflicting element in an insertion are called its children. When a parent is in conflict with a point to be inserted, so are its children. This provides a fast way of getting the list of triangles to remove which may very well be the slowest part of the incremental algorithm.

A divide and conquer approach for triangulations in two dimensions recursively draws a line to split the vertices into two sets. The Delaunay triangulation is computed for each set. Then, the two sets are merged along the splitting line. The merge operation can be done in time approximately $O(n)$. Thus, the total running time can be approximate to $O(n \log n)$. For certain types of point sets, such as a uniform random distribution, by intelligently picking the splitting lines the expected time can be reduced to approximately $O(n \log \log n)$ while still maintaining worst-case performance. One divide and conquer paradigm to performing a triangulation in d-dimensions is presented in: "*DeWall: A Fast Divide & Conquer Delaunay Triangulation Algorithm in $E^d$*", P. Cignoni, C. Montani, and R. Scopigno, Computer-Aided Design, Elsevier Science, Vol. 30(5), April 1998, pp. 333-341, which is incorporated herein in its entirety by reference. One advantageous characteristics of this algorithm is that it can be extended to triangulate point sets in any dimension.

One example embodiment of the present method has the following steps. It should be understood that the following pseudo code algorithm is representative of the present method and is not intended to be limiting. Other embodiment, features and enhancements to the methods provided herein are intended to fall within the scope of the appended claims. Two parallel Delaunay data structures are used, namely, a normal Delaunay mesh and a list of point clusters. The Delaunay mesh vertices are made up of the representative points of the clusters. The present method utilizes the aforementioned parallel data structure approach. As points are added, clusters are added or changed. These changes affect the representative point of the effected clusters.

In one embodiment, cluster analysis is performed by the following steps.

A Delaunay mesh and a cluster list are initialized to empty;
For each data point to be added to the mesh, do;
The data point to be added, is referred to herein as currentPoint;

In the following steps, a new cluster is added with the current point and the representative point of the cluster is added to the Delaunay mesh as a new vertex. The representative point comes from the cluster analysis which is typically the center of the cluster for a definition of a cluster center. It can be any consistent representative point.

If (this is a new cluster to be added) then
    Create a new cluster containing currentPoint, called currentCluster;
    Determine a representative point for currentCluster, called representativePoint;
    Add representativePoint to the Delaunay mesh;
Endif.

In the following, when an existing cluster is updated with a new point, its representative point may change. This point was previously placed as a vertex in the Delaunay mesh and for simplicity, it is removed from the mesh, changed and added back. The delete and add can be avoided by simply moving the representative point in the Delaunay mesh to its new position so long as the Delaunay Property is maintained.

Else if (currentPoint is to be added to an existing cluster) then
    Call the designated cluster as currentCluster;
    Call the representative point of currentCluster, oldRepresentativePoint;
    Remove oldRepresentativePoint from the Delaunay mesh;
    Add the currentPoint to currentCluster;
Endif.

In the following, the analysis may have determined that the cluster needs to be split or merged. These operations are performed before a new representative point is determined and added back to the Delaunay mesh. When a cluster is split, typically into two clusters, both clusters' representative points will need to be added to the Delaunay mesh.

If (currentCluster needs to be split) then
    Split currentCluster;
    For (each of the split clusters) do:
        Call the cluster, splitCluster;
        Determine a representative point for splitCluster, called representativePoint;
        Add representativePoint to Delaunay mesh;
    End for loop.
Endif.

In the following, when a cluster is merged, typically with one other cluster, the other cluster's representative point needs to be removed from the Delaunay mesh. Then after the merge, the representative point of the merged cluster is added to the mesh.

Else if (currentCluster should be merged with another cluster) then
    Call the other cluster, otherCluster;
    Determine the representative point of otherCluster, called representativePoint;
    Remove representativePoint from the Delaunay mesh;
    Merge currentCluster and otherCluster in a new cluster, called mergedCluster;
    Determine representative point for mergedCluster, called representativePoint;
    Add representativePoint to the Delaunay mesh;
Endif.

In this case, the cluster was neither split nor merged and the new representative point needs to be added to the Delaunay mesh. In some cases, this may be accomplished with a move of the old vertex to its new position.

Else
  Determine a new representative point for currentCluster, called representativePoint;
  Add representativePoint to the Delaunay mesh;
 Endif.
 Endif.
 End for Loop.

Figure 6:
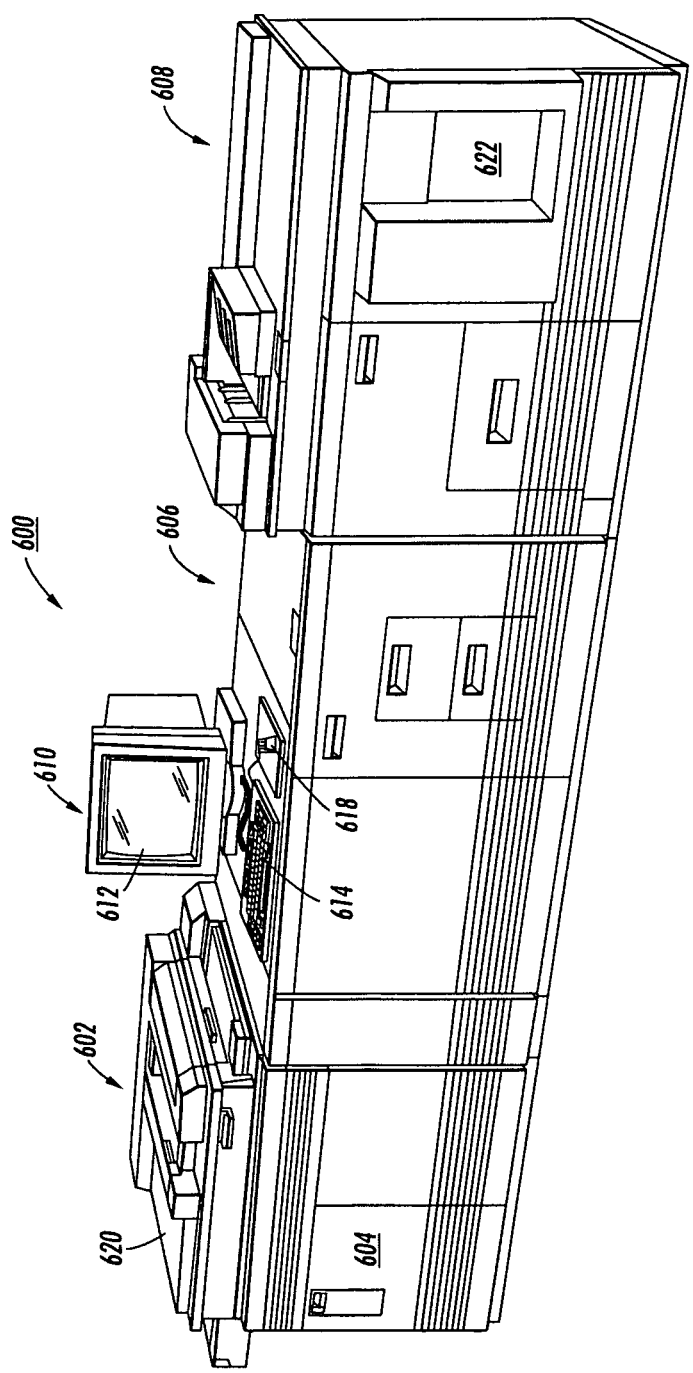
FIG. 6 illustrates one example document reproduction system wherein various aspects of the present method are likely to find their intended uses.

Reference is now being made to FIG. 6 which illustrates one example document reproduction system wherein various aspects of the present method are likely to find their intended uses. System 600 includes an input module 602 having a controller 604, a document processing module 606, and a printer module 608. The document processing module includes a document processing station 610 that includes a display 612, a keyboard 614, and a mouse 618. A scanning device 620 is used to scan the image pixels of a color image. The document processing station may be used by an operator to set parameters or scan operations and other document processing and document printing operations. The instructions for these various operations may be input via the keyboard and/or mouse, or touch screen objects displayed on the display. The document processing station also includes a processor having memory and secondary storage, such as a disk drive, for storage of programs and data required for processing documents through system 600. The printer module 608 also includes processors and controllers for regulating the application of inks or toners onto paper as well as the control of papers moving through the printer module for proper registration in multi-channel color printing, and the like. The system includes one or more discharge areas 622 where finished documents are deposited for retrieval. The special purpose controller 604 (internal to system 600) monitors and regulates the operation of the scanning device 620 for obtaining the image pixel data points of the color image for which the color gamut is to be created. The controller includes a processor capable of executing machine program instructions for carrying out various aspects of the present method via any of a micro-processor or micro-controller, an ASIC, an electronic circuit, or special purpose computer such as is described herein further. Portions of the flow diagrams of the present method may also be implemented partially or fully in hardware in conjunction with machine executable instructions in communication with the controller. The controller also includes a network connection (not shown) for receiving color data points over a network such as an intranet or internet. The controller may also be in digital communication with one or more electronic media readers for the input of image data from electronic storage media such as, for example, a CD-ROM, or magnetic disk.

Figure 7:
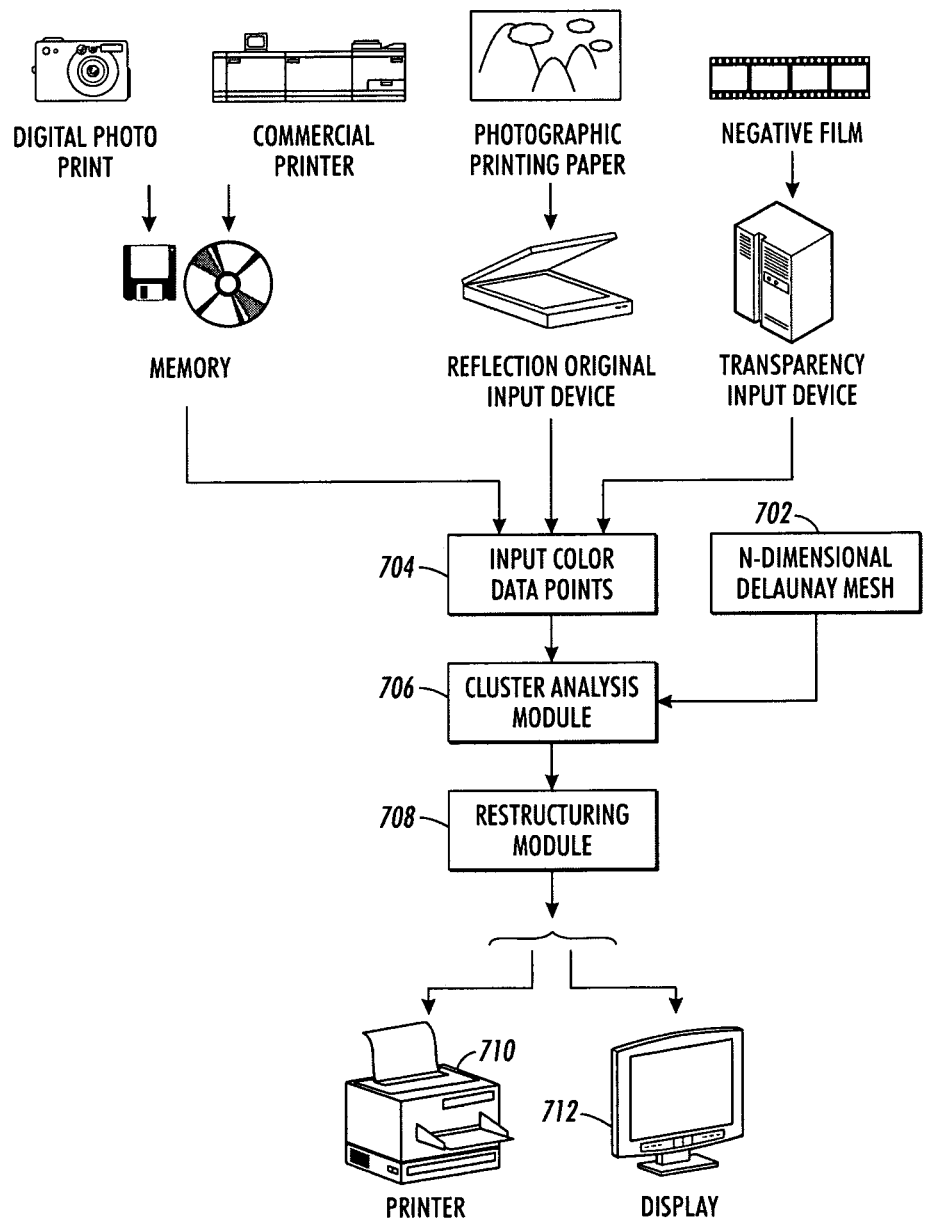
FIG. 7 illustrates the function of a general purpose color management system wherein the present method will receive color data points from one of a plurality of imaging devices and generate a color gamut.

Reference is now being made to FIG. 7 which illustrates the function of a general purpose color management system wherein the present method will receive color data points from one of a plurality of imaging devices and generate a color gamut. The input color signal may be image data captured by a digital camera and stored in memory; image data in which color signals for a commercial printer are recorded in memory; image data read through a reflection original input device such as a scanner; or image data read through a transparency input device from a photographic-sensitized material of a color or monochrome negative film. An n-dimensional Delaunay mesh 702 is retrieved from memory or a storage medium and initialized. The input color data points 704 are provided to the cluster analysis module 706 wherein cluster analysis is performed to determine which new point clusters need to be added to said mesh and which existing point cluster in said mesh is to receive a color data point. The Delaunay mesh is restructured 708 in accordance with the teachings hereof. A gamut map is generated which is used to model the gamut of the color image or a color device such as, for instance, the color device 710 or display 712. The color device can thereafter be used to output the color signal.

One or more aspects of the present method can be implemented on a special purpose computer. Such a special purpose computer can be integrated, in whole or in part, with, for example, a xerographic system or a color management or image processing software or system, which includes a processor capable of executing machine readable program instructions for carrying out one or more aspects of the present method. Such a processor is in communication with a bus (e.g., a backplane interface bus, cross-over bar, or data network). The system includes a main memory capable of storing machine readable instructions to be executed and may include random access memory (RAM) to support reprogramming and flexible data storage. The main memory may further include one or more buffers to store data. Memory may further be used to store executable machine program instructions that implement the methods described herein. The computer system may also include a secondary memory. The secondary memory may include, for example, a hard disk drive and/or a removable storage drive which reads/writes to a removable storage device such as a floppy disk, magnetic tape, optical disk, etc., used to store computer software and other machine readable instructions, and/or data. The secondary memory may also include other similar mechanisms for allowing computer programs or other instructions to be loaded into the computer system for execution. Such mechanisms may include, for example, removable storage adapted to exchange data through an interface. Examples of such mechanisms include a program cartridge and cartridge interface such as that found in video game devices, a removable memory chip such as an EPROM, or PROM, and associated socket, and other removable storage units and interfaces which allow software and/or data to be transferred to the computer system.

The computer system may additionally include a communications interface which acts as both an input and an output to allow software and data to be transferred between the computer system and external devices. Examples of a communications interface include a modem, a network interface such as an Ethernet card, a communications port, a PCMCIA slot and card, etc. Software and data transferred via the communications interface are in the form of signals and data which may be, for example, electronic, electromagnetic, optical, or other signals capable of being transmitted and received via a communications path (i.e., channel) configured to carry such signals and may be include wire, cable, fiber optic, phone line, cellular link, RF, or other communications channels. The computer system may additionally include a display interface that forwards data from a communication bus (or from a frame buffer) to a display device. The computer system may further include a scanning device capable of receiving color images and transforming the images into an electronic format. Such a scanning device would be capable of determining the color and location of image pixels contained in the scanned color image.

Terms such as, computer program medium, computer executable medium, computer usable medium, and computer readable medium, are used herein to broadly refer to media such as main memory and secondary memory, removable storage drive, a hard disk installed in a hard disk drive, and signals. These computer program products are means for providing instructions and/or data to the computer system. The computer readable medium is further capable of storing data, machine instructions, message packets, or other machine readable information, and may include non-volatile memory, such as a floppy, ROM, flash memory, disk memory, CD-ROM, and other permanent storage useful, for example, for transporting information, such as data and computer instructions. A computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

The computer readable medium may additionally comprise computer readable information in a transitory state medium such as a network link and/or a network interface, including a wired network or a wireless network, which allows the computer system to read such computer readable information. Computer programs (also called computer control logic) may be stored in main memory and/or secondary memory. Computer programs may also be received via the communications interface. Such computer programs, when executed, enable the computer system to perform one or more aspects and other features and capabilities of the present methods as provided herein.

It should be understood that the teachings hereof can be implemented in hardware or software using any known or later developed systems, structures, devices, and/or software by those skilled in the applicable art without undue experimentation from the functional description provided herein with a general knowledge of the relevant arts.

The methods hereof may be partially or fully implemented in software using object or object-oriented software development environments that provide portable source code that can be used on a variety of computer, workstation, server, network, or other hardware platforms. For example, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. One or more of the capabilities hereof can be emulated in a virtual environment as provided by an operating system, specialized programs, or from a server.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for reducing complexity when constructing a color gamut with a Delaunay mesh, the method comprising:
   receiving, into a memory, a plurality of color data points of image pixels of a color image;
   defining an n-dimensional Delaunay mesh of individual point clusters;
   performing cluster analysis on said received plurality of color data points to determine which new point clusters need to be added to said mesh and which existing point cluster in said mesh is to receive a color data point;
   restructuring said n-dimensional Delaunay mesh comprising:
      for each point cluster in said Delaunay mesh,
         determining a representative point to serve as a normal vertex for said cluster; and
         adding said normal vertex to said Delaunay mesh;
   generating a color gamut from said Delaunay mesh;
   storing said generated color gamut to said memory; and
   using said generated color gamut to model any of: the gamut of said color image or the gamut of a color output device used to render said color image.

2. The method of claim 1, further comprising adding a new point cluster to said Delaunay mesh, said adding comprising:
   determining a representative point to serve as a normal vertex for said new point cluster; and
   adding said normal vertex to said Delaunay mesh.

3. The method of claim 1, further comprising modifying an existing point cluster in said Delaunay mesh, said modifying comprising:
   identifying a representative point which serves as a normal vertex for said existing point cluster in said Delaunay mesh;
   deleting said normal vertex from said Delaunay mesh;
   modifying the point cluster;
   determining a representative point to serve as a normal vertex for said modified point cluster; and
   adding said normal vertex to said Delaunay mesh.

4. The method of claim 1, further comprising splitting an existing point cluster into a plurality of new point clusters in said Delaunay mesh, said splitting comprising:
   identifying a representative point which serves as a normal vertex for said existing point cluster in said Delaunay mesh;
   deleting said normal vertex from said Delaunay mesh; and
   for each new point cluster to be added to said mesh,
      determining a representative point to serve as a normal vertex for said new point cluster; and
      adding said normal vertex to said Delaunay mesh.

5. The method of claim 1, further comprising merging existing point clusters into a new point cluster in said Delaunay mesh, said merging comprising:
   for each existing point cluster to be merged, removing a normal vertex associated with said existing point cluster from said Delaunay mesh; and
   adding a new point cluster to said Delaunay mesh, comprising:
      determining a representative point to serve as a normal vertex for said new point cluster; and
      adding said normal vertex to said Delaunay mesh.

6. A system for reducing complexity when constructing a color gamut with a Delaunay mesh, the system comprising:

a storage medium capable of storing data; and
a processor in communication with said storage medium, said processor capable of executing a machine readable instruction for performing the method of:
  receiving, into said memory, a plurality of color data points of image pixels of a color image;
  defining an n-dimensional Delaunay mesh of individual point clusters;
  performing cluster analysis on said plurality of color data points to determine which new point clusters need to be added to said mesh and which existing point cluster in said mesh is to receive a color data point;
  restructuring said n-dimensional Delaunay mesh comprising:
    for each point cluster in said Delaunay mesh,
      defining a representative point to serve as a normal vertex for said cluster; and
      adding said normal vertex to said Delaunay mesh;
  generating a color gamut from said Delaunay mesh;
  storing said generated color gamut to said storage medium; and
  using said generated color gamut to model any of: the gamut of said color image or the gamut of a color output device used to render said color image.

7. The system of claim 6, further comprising adding a new point cluster to said Delaunay mesh, said adding comprising:
  determining a representative point to serve as a normal vertex for said new point cluster; and
  adding said normal vertex to said Delaunay mesh.

8. The system of claim 6, further comprising modifying an existing point cluster in said Delaunay mesh, said modifying comprising:
  identifying a representative point which serves as a normal vertex for said existing point cluster in said Delaunay mesh;
  deleting said normal vertex from said Delaunay mesh;
  modifying the point cluster;
  determining a representative point to serve as a normal vertex for said modified point cluster; and
  adding said normal vertex to said Delaunay mesh.

9. The system of claim 6, further comprising splitting an existing point cluster into a plurality of new point clusters in said Delaunay mesh, said splitting comprising:
  identifying a representative point which serves as a normal vertex for said existing point cluster in said Delaunay mesh;
  deleting said normal vertex from said Delaunay mesh; and
  for each new point cluster to be added to said mesh,
    determining a representative point to serve as a normal vertex for said new point cluster; and
    adding said normal vertex to said Delaunay mesh.

10. The system of claim 6, further comprising merging existing point clusters into a new point cluster in said Delaunay mesh, said merging comprising:
  for each existing point cluster to be merged, removing a normal vertex associated with said existing point cluster from said Delaunay mesh; and
  adding a new point cluster to said Delaunay mesh, comprising:
    determining a representative point to serve as a normal vertex for said new point cluster; and
    adding said normal vertex to said Delaunay mesh.

11. A computer program product for reducing complexity when constructing a color gamut with a Delaunay mesh, the computer program product comprising:
a non-transitory computer readable media for storing instructions that, when executed on a computer, cause the computer to perform a method comprising:
  receiving, into a memory, a plurality of color data points of image pixels of a color image;
  defining an n-dimensional Delaunay mesh of individual point clusters;
  performing cluster analysis on said plurality of color data points to determine which new point clusters need to be added to said mesh and which existing point cluster in said mesh is to receive a color data point;
  restructuring said n-dimensional Delaunay mesh comprising:
    for each point cluster in said Delaunay mesh,
      defining a representative point to serve as a normal vertex for said cluster; and
      adding said normal vertex to said Delaunay mesh;
  generating a color gamut from said Delaunay mesh;
  storing said generated color gamut to said memory; and
  using said generated color gamut to model any of: the gamut of said color image or the gamut of a color output device used to render said color image.

12. The computer program product of claim 11, further comprising adding a new point cluster to said Delaunay mesh, said adding comprising:
  determining a representative point to serve as a normal vertex for said new point cluster; and
  adding said normal vertex to said Delaunay mesh.

13. The computer program product of claim 11, further comprising modifying an existing point cluster in said Delaunay mesh, said modifying comprising:
  identifying a representative point which serves as a normal vertex for said existing point cluster in said Delaunay mesh;
  deleting said normal vertex from said Delaunay mesh;
  modifying the point cluster;
  determining a representative point to serve as a normal vertex for said modified point cluster; and
  adding said normal vertex to said Delaunay mesh.

14. The computer program product of claim 11, further comprising splitting an existing point cluster into a plurality of new point clusters in said Delaunay mesh, said splitting comprising:
  identifying a representative point which serves as a normal vertex for said existing point cluster in said Delaunay mesh;
  deleting said normal vertex from said Delaunay mesh; and
  for each new point cluster to be added to said mesh,
    determining a representative point to serve as a normal vertex for said new point cluster; and
    adding said normal vertex to said Delaunay mesh.

15. The computer program product of claim 11, further comprising merging existing point clusters into a new point cluster in said Delaunay mesh, said merging comprising:
  for each existing point cluster to be merged, removing a normal vertex associated with said existing point cluster from said Delaunay mesh; and
  adding a new point cluster to said Delaunay mesh, comprising:
    determining a representative point to serve as a normal vertex for said new point cluster; and
    adding said normal vertex to said Delaunay mesh.

* * * * *